United States Patent
Ziazadeh et al.

(10) Patent No.: US 7,813,495 B1
(45) Date of Patent: Oct. 12, 2010

(54) APPARATUS AND METHOD FOR AUTOMATIC GAIN CONTROL AND ECHO CANCELLATION IN A NETWORK SYSTEM

(75) Inventors: Ramsin M. Ziazadeh, San Jose, CA (US); Vijaya Ceekala, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 1104 days.

(21) Appl. No.: 11/183,245

(22) Filed: Jul. 16, 2005

(51) Int. Cl.
*H04M 9/00* (2006.01)
*H04M 7/04* (2006.01)

(52) U.S. Cl. .................................................... 379/398

(58) Field of Classification Search .......... 379/338–418
See application file for complete search history.

(56) References Cited

U.S. PATENT DOCUMENTS

| | | | | |
|---|---|---|---|---|
| 4,757,530 | A * | 7/1988 | Arnon | 379/404 |
| 6,545,622 | B1 * | 4/2003 | Kamal et al. | 341/144 |
| 6,980,644 | B1 * | 12/2005 | Sallaway et al. | 379/391 |
| 2006/0062378 | A1 * | 3/2006 | Choksi | 379/399.01 |

FOREIGN PATENT DOCUMENTS

WO  WO/2004/073274  *  8/2004  .................. 375/232

* cited by examiner

*Primary Examiner*—Alexander Jamal

(57) ABSTRACT

A communications cabling front-end architecture that achieves solid echo cancellation and lower noise performance by combining an echo-cancellation circuit and an equalizer function at the same point, at the most front-end of the system.

20 Claims, 2 Drawing Sheets

APPARATUS AND METHOD FOR AUTOMATIC GAIN CONTROL AND ECHO CANCELLATION IN A NETWORK SYSTEM

TECHNICAL FIELD OF THE INVENTION

The present invention is generally directed to data processing system networks and, in particular, to an apparatus and method for automatic gain control and echo cancellation in a network system cabling front end.

BACKGROUND OF THE INVENTION

In full-duplex systems, such as Gigabit Ethernets and others, the system must be capable of transmitting and receiving signals on a same differential pair wire. Due to the large signal swings in the channel (transmitted signal plus the received signal), it is highly desirable to reject the echo signal (near-end transmit signal) as much as possible, leaving more room for the received signal, thereby maximizing the dynamic range.

For a given noise in a receiver, the received signal-to-noise ratio (SNR) degrades as the signal travels through long distances, e.g., 100 meters. Hence, cable equalization along with automatic gain control circuits are used to maximize the SNR along with reducing the inter-symbol interference (ISI), thereby utilizing the entire dynamic range of the receiver. The final received signal is then digitized via an analog-to-digital converter (ADC) for further digital signal processing (DSP). These conventional systems suffer from a degrading signal-to-residual echo ratio and signal-to-noise ratio at higher cable lengths.

Therefore, there is a need in the art for an improved echo-cancellation and automatic gain control front end to reduce these problems in conventional systems.

SUMMARY OF THE INVENTION

A preferred embodiment provides a communications cabling front-end architecture that achieves solid echo cancellation and lower noise performance by combining an echo-cancellation circuit and an equalizer function at the same point, at the most front-end of the system.

To address the above-discussed deficiencies of the prior art, it is a primary object of the present invention to provide a communications cabling front end architecture comprising a front end circuit having a transmit signal path, a transmit replica signal path and a receive signal path, the transmit signal path and the receive signal path being connected to communicate across a data cable; a conditioning circuit connected to the transmit replica signal path and the receive signal path, the conditioning circuit providing combined automatic gain control, echo cancellation, and equalization functions to the front end circuit.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation. A controller may be implemented in hardware, firmware or software, or some combination of at least two of the same. It should be noted that the functionality associated with a controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
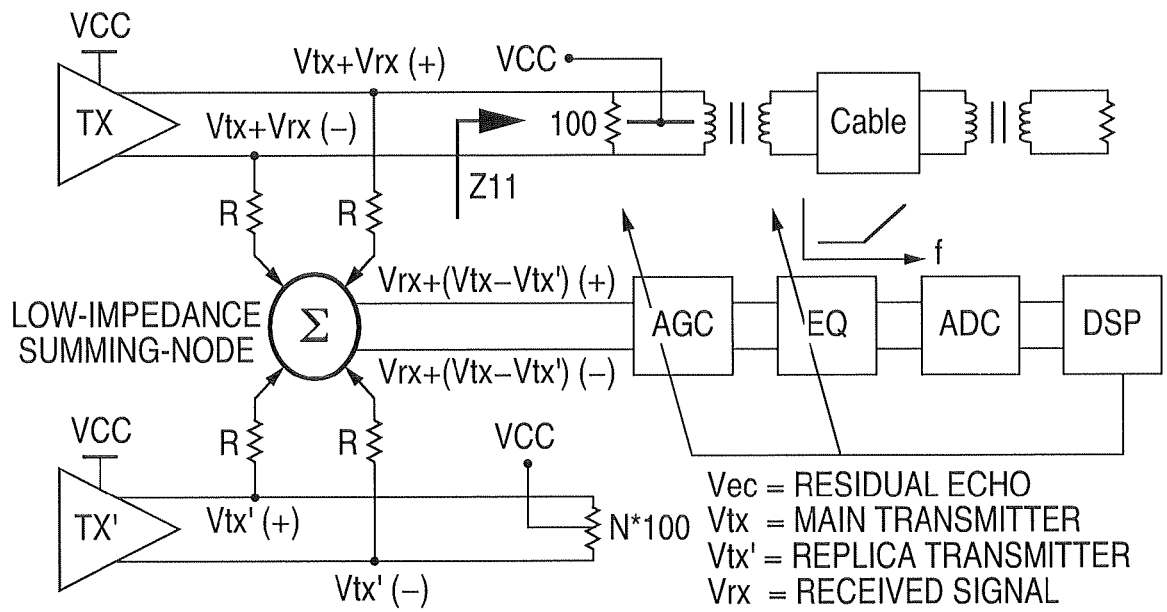
FIG. 1 depicts a simplified block diagram of a front-end architecture.
Figure 2:
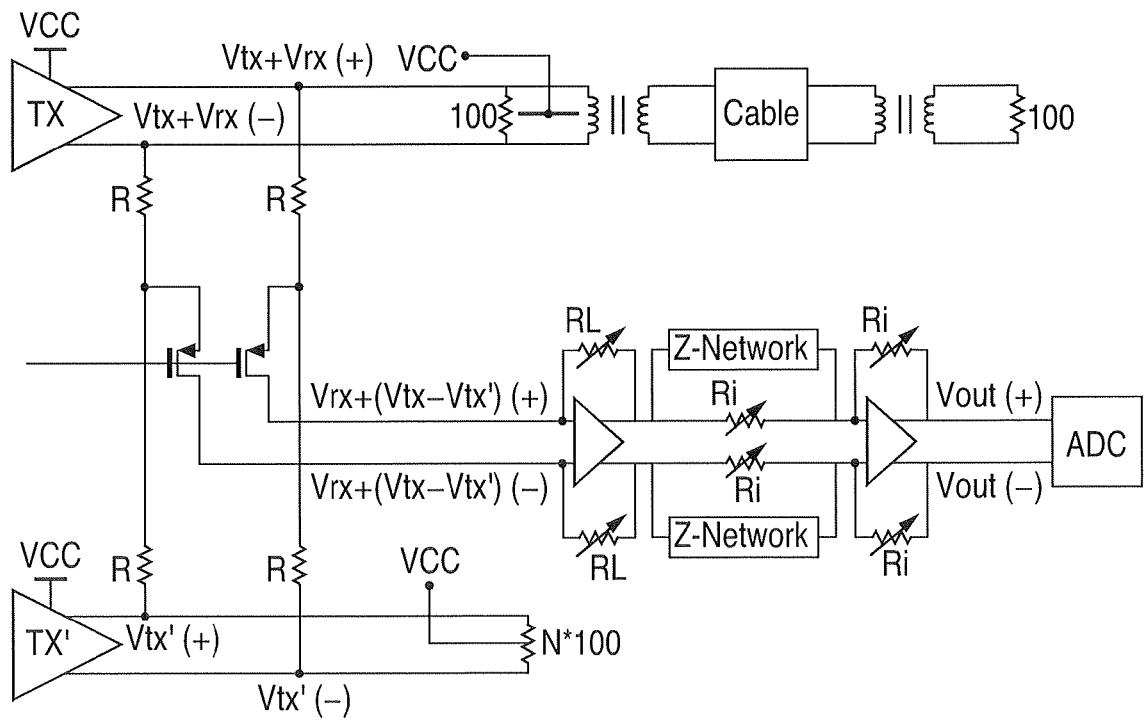
FIG. 2 depicts a detailed diagram of a front-end architecture.
Figure 3:
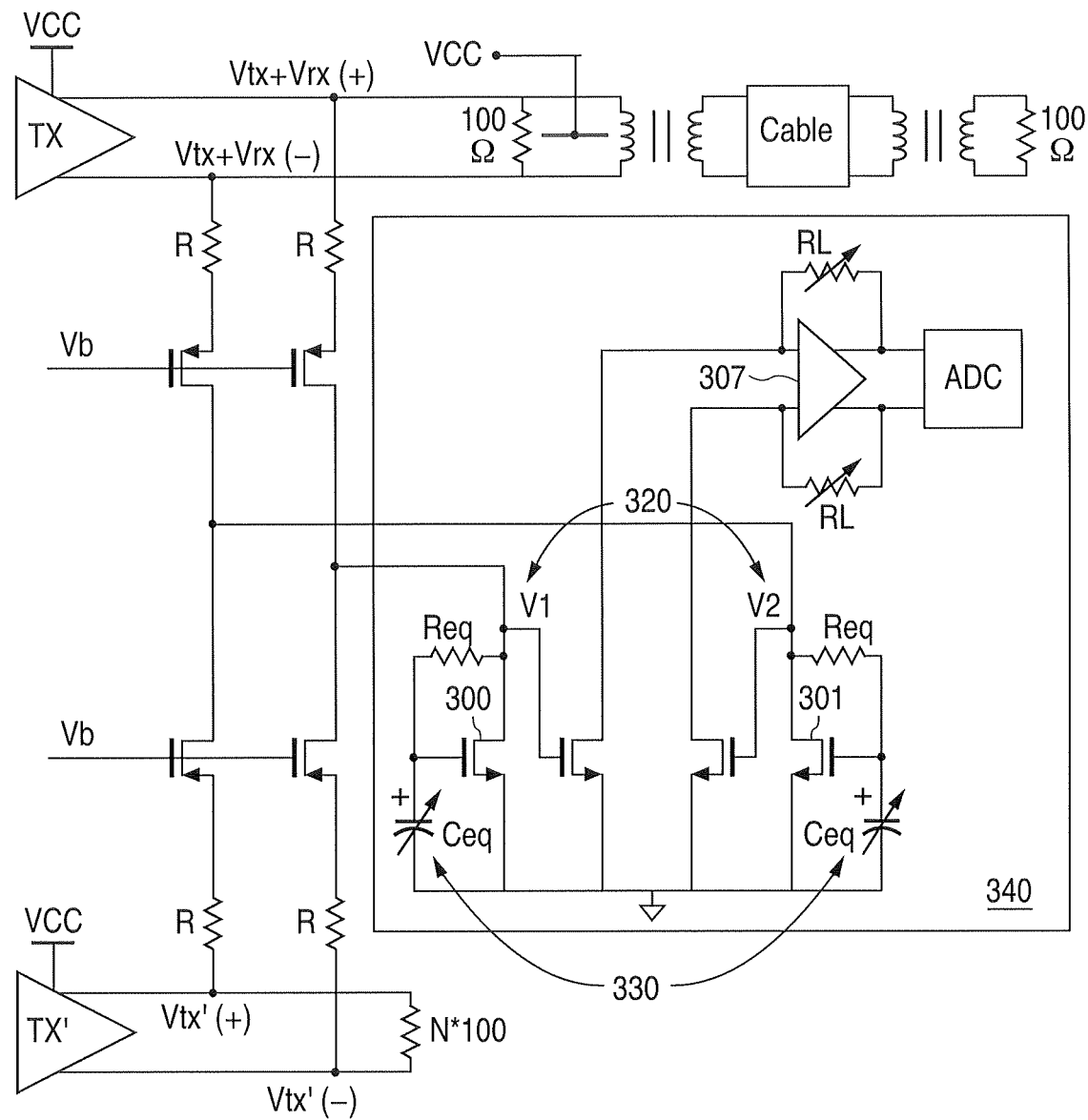
FIG. 3 illustrates a front-end architecture, in accordance with an exemplary embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

In conventional systems, to maximize the dynamic range of the receiver, the receive signals along with the transmit signals are fed into an echo canceller circuit in which the bulk of the echo energy is removed by using a replica transmitter. FIG. 1 depicts a simplified block diagram of a conventional front-end architecture. FIG. 2 depicts a more detailed diagram of a conventional front-end architecture. As used herein, Vec indicates the residual echo, Vtx indicates the main transmitter, Vtx' indicates the replica transmitter, and Vrx indicates the received signal.

In the circuits as shown in FIGS. 1 and 2, the replica transmitter reproduces the main transmitter signal (at a lower power), which is used to cancel the echo by signal subtraction. The residual echo from the echo-canceller circuit (EC), along with the received signal, is then taken to an automatic gain control (AGC) and finally to the cable equalizer circuit (EQ), consisting of two operational amplifiers.

The echo signal has both near-end and far-end reflection components. The near-end is caused by the Z11 impedance mismatch of the transformer and near-end cable impedance. The far-end reflection is caused by the far-end termination mismatch along with impedance mismatches along the cable. The near-end echo does not depend on the cable length and thus contains low to high frequency contents. Within the analog domain, the EC circuit can cancel the near-end echo only and the digital back end DSP cancels the remaining residual echo which may consist of residual near-end and far-end echo.

As the residual echo plus the received signal go through AGC and EQ circuits, the high frequency contents of the residual echo plus any noise sources introduced prior to the EQ circuit gets gained up by the equalizer function in which the equalizer is designed to compensate for the losses in the cable at high-frequencies by introducing signal boost at those frequencies. Since the near-end echo signal does not depend on the cable length, it does not have loss in the signal, but is further boosted by the same equalizer function. Thus, in conventional systems, the signal-to-residual-echo ration and the SNR degrade at higher cable lengths.

FIG. 3 shows a communications cabling front-end architecture, in accordance with a preferred embodiment, that achieves solid echo cancellation and lower noise performance by combining an echo-cancellation circuit and an equalizer function at the same point, at the most front-end of the system. In this figure, the conventional front-end portion of the circuit is familiar to those of skill in the art, and is not described in detail here. Conditioning circuit 340, as disclosed herein, combines automatic gain control, cable equalization, and echo cancellation features for the front end at a single connection to the conventional front end.

In this case, both the receive path and the replica-transmit path get summed at the same point, where equalization takes place. In this way, the system minimizes any mismatches in the replica-transmit signal and the received-plus-echo signal. In the disclosed system, any noise contributed by the front-end circuits get gained up by the AGC function, in contrast to getting gained up by the AGC and EQ functions, as in conventional systems. Note that for long cable lengths, the boosting factor for the EQ function could be as high as 18-22 dB at high frequencies, which is far greater than the AGC gains of −12 dB to 0 dB, for example.

As shown in FIG. 3, the equalization is preferably performed by reducing the feedback factor of transistors 300 and 301 at higher frequencies, thereby increasing the output impedance of transistors 300 and 301 from 1/Gm at low frequencies to approaching 1/gds at higher frequencies, where gm is the transconductance and gds is the drain conductance, to provide a voltage boost at V1 and V2, which form the summing node/equalizer 320. The equalizer gain can be controlled by a capacitor digital-to-analog converter (DAC) as shown as Ceq 330, which can be implemented as a Z-network or similar low-pass structure. The resulting currents (received signal plus the residual echo) are then fed into an operational amplifier 307 with resistor feedback DAC acting as the AGC function.

Although the present invention has been described with an exemplary embodiment, various changes and modifications may be suggested to one skilled in the art. It is intended that the present invention encompass such changes and modifications as fall is within the scope of the appended claims.

What is claimed is:

1. A communications cabling front end architecture, comprising:
a front end circuit having a transmit signal path, a transmit replica signal path and a receive signal path, the transmit signal path and the receive signal path being connected to communicate across a data cable; and
a conditioning circuit connected to the transmit replica signal path and the receive signal path, the conditioning circuit providing combined automatic gain control, echo cancellation, and equalization functions to the front end circuit,
wherein the conditioning circuit is configured to perform the echo cancellation function and the equalization function before the automatic gain control function.

2. The architecture of claim 1, wherein the equalization function of the conditioning circuit is implemented by a variable capacitor pair controlling a transistor pair.

3. The architecture of claim 1, wherein the conditioning circuit comprises two circuit parts in parallel with each other, each circuit part having two transistors and a capacitor, the two transistors and the capacitor of each circuit part configured to perform the equalization function.

4. The architecture of claim 3, wherein the automatic gain control function is implemented by an operational amplifier with resistor feedback, and wherein the signals from the two circuit parts are transmitted to the operational amplifier.

5. The architecture of claim 4, wherein the conditioning circuit is connected to the front end circuit at a single differential wire pair connection, and
wherein each wire of the single differential wire pair is coupled to a different one of the two circuit parts of the conditioning circuit.

6. The architecture of claim 1, wherein the equalization function is capable of providing a gain between 18 dB and 22 dB.

7. The architecture of claim 1, wherein the equalization function is performed by reducing a feedback factor of a pair of transistors.

8. The architecture of claim 1, wherein an equalizer gain can be controlled by a capacitor digital-to-analog converter.

9. The architecture of claim 8, wherein the capacitor digital-to-analog converter is implemented as a Z-network.

10. A communications apparatus, comprising:
a transmitter configured to produce a transmit signal;
a receiver configured to receive a receive signal;
a replica transmitter configured to produce a transmit replica signal corresponding to the transmit signal;
a front end circuit having a transmit signal path, a transmit replica signal path and a receive signal path, the transmit signal path and the receive signal path being connected to communicate across a data cable, the front end circuit connected to the transmitter, receiver, and replica transmitter; and
a conditioning circuit connected to the transmit replica signal path and the receive signal path, the conditioning circuit providing combined automatic gain control, echo cancellation, and equalization functions to the front end circuit,
wherein the conditioning circuit is configured to perform the echo cancellation function and the equalization function before the automatic gain control function.

11. The communications apparatus of claim 10, wherein the equalization function of the conditioning circuit is implemented by a variable capacitor pair controlling a transistor pair.

12. The communications apparatus of claim 10, wherein the conditioning circuit comprises two circuit parts in parallel with each other, each circuit part having two transistors and a capacitor, the two transistors and the capacitor of each circuit part configured to perform the equalization function.

13. The communications apparatus of claim 12, wherein the automatic gain control function is implemented by an operational amplifier with resistor feedback, and wherein the signals from the two circuit parts are transmitted to the operational amplifier.

14. The communications apparatus of claim 13, wherein the conditioning circuit is connected to the front end circuit at a single differential wire pair connection, and
wherein each wire of the single differential wire pair is coupled to a different one of the two circuit parts of the conditioning circuit.

15. The communications apparatus of claim 10, wherein the equalization function is capable of providing a gain between 18 dB and 22 dB.

16. The communications apparatus of claim 10, wherein the equalization function is performed by reducing a feedback factor of a pair of transistors.

17. The communications apparatus of claim 10, wherein an equalizer gain can be controlled by a capacitor digital-to-analog converter.

18. The communications apparatus of claim 17, wherein the capacitor digital-to-analog converter is implemented as a Z-network.

19. A method comprising:

producing a transmit signal and providing the transmit signal to a front end circuit, the front end circuit comprising a transmit signal path for providing the transmit signal to a cable;

receiving a receive signal from the front end circuit, the front end circuit comprising a receive signal path for receiving the receive signal from the cable;

generating a transmit replica signal corresponding to the transmit signal, the front end circuit comprising a replica transmit signal path;

performing combined echo cancellation and equalization functions for the front end circuit; and performing an automatic gain control function after performing the combined echo cancellation and equalization functions.

20. The method of claim 19, wherein:

the equalization function is implemented by a variable capacitor pair controlling a first transistor pair;

the automatic gain control function is implemented by an operational amplifier with resistor feedback; and the equalization function is performed by reducing a feedback factor of second transistor pair.

* * * * *